United States Patent
Landseadel

(10) Patent No.: US 11,632,052 B2
(45) Date of Patent: Apr. 18, 2023

(54) DUAL ACTIVE BRIDGE WITH DISTRIBUTED INDUCTANCE

(71) Applicant: Current Ways, Inc., Santee, CA (US)

(72) Inventor: Bradley A. Landseadel, Simi Valley, CA (US)

( * ) Notice: Subject to any disclaimer, the term of this patent is extended or adjusted under 35 U.S.C. 154(b) by 0 days.

(21) Appl. No.: 17/302,401

(22) Filed: May 1, 2021

(65) Prior Publication Data

US 2021/0351712 A1    Nov. 11, 2021

Related U.S. Application Data

(60) Provisional application No. 63/021,264, filed on May 7, 2020.

(51) Int. Cl.
  *H02M 3/335*  (2006.01)
  *H02M 1/42*  (2007.01)

(52) U.S. Cl.
  CPC ..... *H02M 3/33584* (2013.01); *H02M 1/4233* (2013.01); *H02M 3/33573* (2021.05); *H02M 3/33576* (2013.01); *H02M 3/33569* (2013.01)

(58) Field of Classification Search
  CPC ............ H02M 3/335; H02M 3/33569; H02M 3/33573; H02M 3/33576; H02M 3/33584; H02M 1/42; H02M 1/4233
  See application file for complete search history.

(56) References Cited

U.S. PATENT DOCUMENTS

| | | | |
|---|---|---|---|
| 9,893,633 B1* | 2/2018 | Li | H02M 3/33546 |
| 2013/0265804 A1* | 10/2013 | Fu | H02M 3/33576 363/17 |
| 2018/0278168 A1* | 9/2018 | Brown | H02J 7/022 |

OTHER PUBLICATIONS

Zhang Z. et al., M.A.E. (2016). High Frequency AC Inductor and Design for Dual Active Bridge (DAB) Converters. In Proceedings of the IEEE Applied Power Electronics Conference 2016 IEEE.
Zhao, B., Overview of Dual-Active-Bridge Isolated Bidirectional Dc-DC Converter for High-Frequency-Link Power-Conversion System. In IEEE Transactions on Power Electronics, vol. 29, No. 8, Aug. 2014.

* cited by examiner

*Primary Examiner* — Gary L Laxton
(74) *Attorney, Agent, or Firm* — Themis Law

(57) ABSTRACT

A dual active bridge includes a first converter arranged on a primary side of the dual active bridge, a second converter arranged on a secondary side of the dual active bridge, a high frequency transformer that has two windings and that operatively connects the first converter to the second converter, and a plurality of inductors, which are arranged along the legs on one of the two windings of the high frequency transformer, and which are split between the legs of that winding. In one embodiment, the plurality of inductors are split between the legs of the winding disposed on the secondary side of the dual active bridge. The plurality of inductors may consist of two inductors, of which a first one is arranged of the first leg of the winding and a second one is arranged on the second leg of the winding.

3 Claims, 4 Drawing Sheets

DUAL ACTIVE BRIDGE WITH DISTRIBUTED INDUCTANCE

FIELD OF THE INVENTION

The present invention concerns a dual active bridge, and, more particularly, a dual active bridge that comprises a plurality of inductors split between the legs of one of the two windings of the high frequency transformer that connects the primary and the secondary sides of the dual active bridge.

BACKGROUND OF THE INVENTION

On-Board Chargers (OBCs) of electric vehicles and hybrid electric vehicles typically include an AC-DC Power Factor Correction (PFC) stage and an isolated DC-DC converter stage. In order to satisfy increases in battery capacity in newer designs, OBCs must be designed for higher power capacity, and with the increasing power capacity of OBCs, factors such as power density and efficiency are becoming increasingly important.

In these types of applications, dual active bridges (DABs) provide the DC-DC stage and have attracted growing interest due to their symmetric structure, their low number of magnetic components, and their ability to switch at higher frequencies. A DAB is a bidirectional and controllable DC-DC converter that is typically comprised of eight semiconductor devices, a high frequency transformer, and DC-link capacitors.

The symmetric structure of the DAB includes identical primary and secondary bridges and can provide bidirectional power flow control. The topology of a DAB is illustrated in FIG. 1, in which 10 indicates the DAB as a whole, $V_{in}$ and $V_{out}$ indicate the primary and secondary DC-link voltages, 20 indicates a high frequency transformer, and $S_1 \ldots _8$ indicate controllable switch cells.

The topologies of conventional DABs provide for an inductor $L_k$ located on a single leg of transformer 20, on primary side 30. Inductor $L_k$ is required to reduce the peak currents to acceptable levels for the switch cells and to store energy for different modes of operation of DAB 10.

Although this conventional approach works, it requires an inductor with a high volt-microsecond (V-μs) product design in order to prevent saturation. This is due to potentially high voltages applied from the primary DC link voltage $V_{in}$ and the duty cycle applied from switch cells $S_1$-$S_4$. In this configuration, the voltage applied across inductor $L_k$ is approximately the sum of primary DC link voltage $V_{in}$ and secondary DC output voltage $V_{out}$ minus any DCR (Direct Current Resistance) voltage losses in the circuit.

In particular, with the configuration depicted in FIG. 1, the voltage across inductor $L_k$ is calculated as follows:

$$V_{lk} = V_{in} + V_{out} - (V_{CESAT-S1} + V_{CESAT-S2} + V_{CESAT-S3} + V_{CESAT-S4} + V_{CESAT-S5} + V_{CESAT-S6} + V_{CESAT-S7} + V_{CESAT-S8}) - (I_k \cdot R),$$

where:
$V_{lk}$=voltage across inductor $L_k$,
$V_{in}$=primary DC link voltage,
$V_{out}$=secondary DC link voltage,
$V_{CESAT-S1} \ldots _{CESAT-S8}$=saturation voltage of switch cells $S_1 \ldots S_8$,
$I_k$=current,
R=resistance.

For example, in a typical application with high DC-link voltages, the preceding equation reads as:

$$V_{lk} = 375 + 350 - (2 \times 8) - (20 \times 1.5) = 679$$

The high R value is generally due to skin effect in the copper of the magnetics, which significantly increases losses in these components at frequency.

FIG. 2 depicts a simulation with 180-1 of inductance for inductor $L_k$ disposed on primary side 30 of DAB 10 and shows that the voltage applied across inductor $L_k$ is approximately 670 VDC. In this example, DC Link voltage $V_{in}$ is approximately 375 VDC and output voltage $V_{out}$ is approximately 350 VDC, the difference between the sum of these voltages and the voltage across inductor $L_k$ resulting in copper losses in inductor $L_k$ and transformer 20.

In particular, in FIG. 2 the top trace is the current $I_{lk}$ in inductor $L_k$, the second trace shows the gate logic for the primary switch and the secondary switch, and the third trace is the voltage across inductor $L_k$. The resonant operation of DAB 10 can be seen as the voltage goes from peak voltage back toward zero then back again to peak voltage.

The V-μs product for the results in FIG. 2 is, therefore, $670/F_{sw} \cdot T_{on}/T_{period}$, with the switching frequency Fsw equaling 48 kHz, which is equal for the Pulse Width Modulation (PWM) frequency of the simulation of the DAB 10, and with $T_{on}/T_{period}$ equaling the duty cycle of the applied voltage across inductor $L_k$. This results in a core flux requirement that is greater than or equal to 2,791 V-μs.

SUMMARY OF THE INVENTION

A dual active bridge according to the invention includes a first converter arranged on a primary side of the dual active bridge, a second converter arranged on a secondary side of the dual active bridge, a high frequency transformer that has two windings and that operatively connects the first converter to the second converter, and a plurality of inductors, which are arranged along the legs on one of the two windings of the high frequency transformer, and which are split between the legs of that winding.

In one embodiment, the plurality of inductors are split between the legs of the winding disposed on the secondary side of the dual active bridge. The plurality of inductors may consist of two inductors, of which a first one is arranged on the first leg of the winding and a second one is arranged on the second leg of the winding.

In one embodiment, the first converter receives a DC-link voltage from a voltage source, for example, the grid, through an AC-DC stage, and the second converter provides a DC-link voltage to a load, for example, a battery.

Each converter may include four bidirectional switch cells, and in that case a voltage across the first and the second inductor would be calculated as follows:

$$V_{lk} = \tfrac{1}{2} \cdot (V_{in} + V_{out}) - \Sigma V_{CESAT-S1} \ldots _{CESAT-S8} - (I \cdot R)$$

where:
$V_{lk}$=voltage across the first and the second inductor,
$V_{in}$=DC-link voltage from a voltage source,
$V_{out}$=DC-link voltage to a load,
$V_{CESAT-S1} \ldots _{CESAT-S8}$=saturation voltage of bidirectional switch cells $S_1 \ldots S_8$,
I=current,
R=resistance of the first and the second inductor.

BRIEF DESCRIPTION OF THE DRAWINGS

The drawings constitute a part of this specification and include exemplary embodiments of the invention, which may be embodied in various forms. It is to be understood

DETAILED DESCRIPTION OF EMBODIMENTS OF THE INVENTION

Detailed descriptions of embodiments of the invention are provided herein. It is to be understood, however, that the present invention may be embodied in various forms. Therefore, the specific details disclosed herein are not to be interpreted as limiting, but rather as a representative basis for teaching one skilled in the art how to employ the present invention in virtually any detailed system, structure, or manner.

Figure 1:
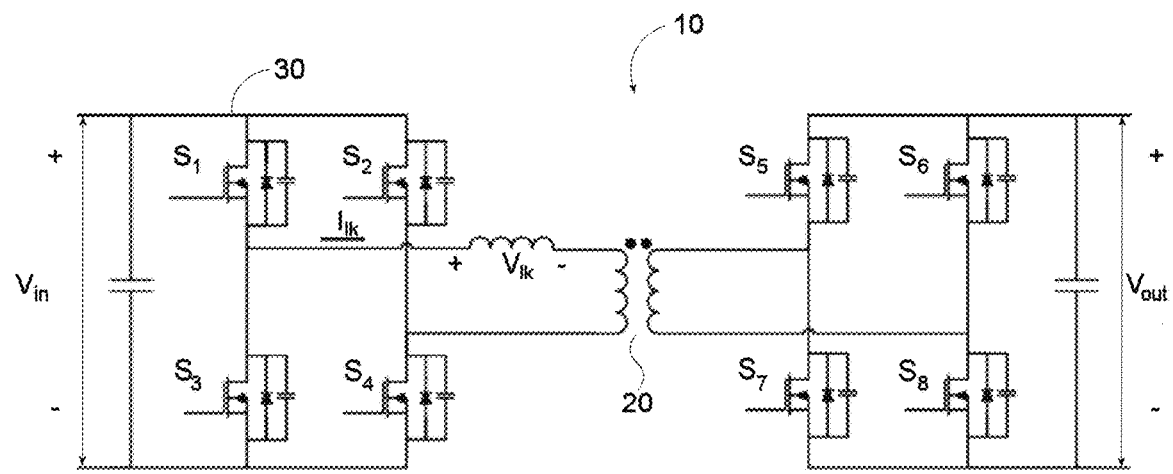
FIG. 1 illustrates a dual active bridge according to the prior art.
Figure 2:
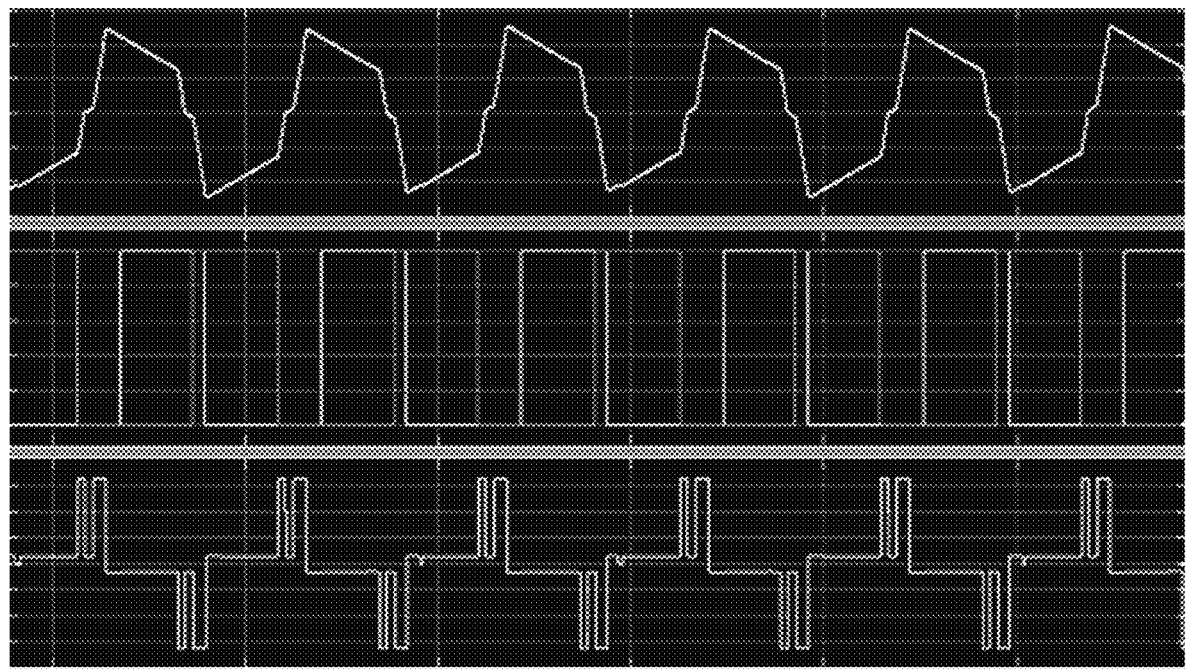
FIG. 2 is a chart illustrating the operation of a dual active bridge as depicted in FIG. 1.
Figure 3:
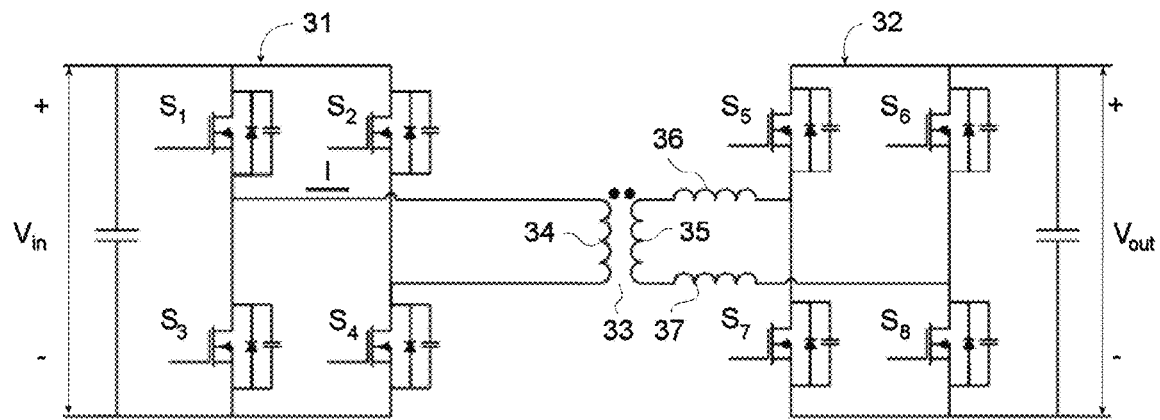
FIG. 3 illustrates, in schematic form, a dual active bridge according to the invention.

Turning first to FIG. 3, a dual active bridge 30 according to the invention includes a first converter 31, arranged on a primary side of dual active bridge 30; a second converter 32, arranged on a secondary side of the dual active bridge; and a high frequency transformer 33, which has a first winding 34 and a second winding 35, and which is disposed between first converter 31 and second converter 32, so as to operatively connect first converter 31 to second converter 32, and vice versa.

Each of first converter 31 and second converter 32 includes four bidirectional switch cells $S_1 \ldots S_4$ and $S_5 \ldots S_8$ according to an architecture which is known in the art and which, accordingly, will not be described further.

Figure 6:
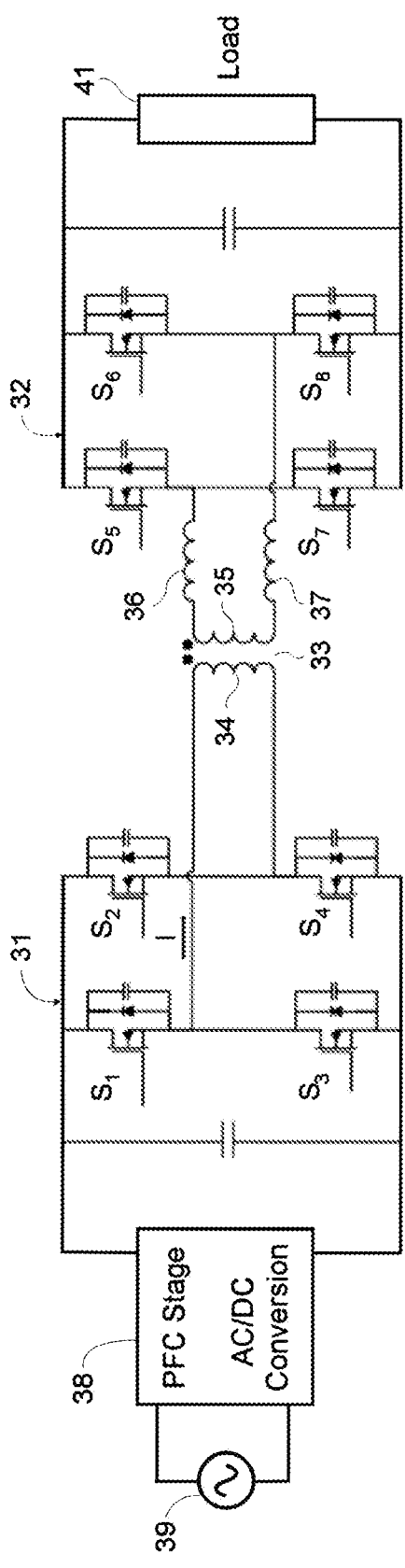
FIGS. 6 and 7 illustrate applications of a dual active bridge as depicted in FIG. 3.
Figure 7:
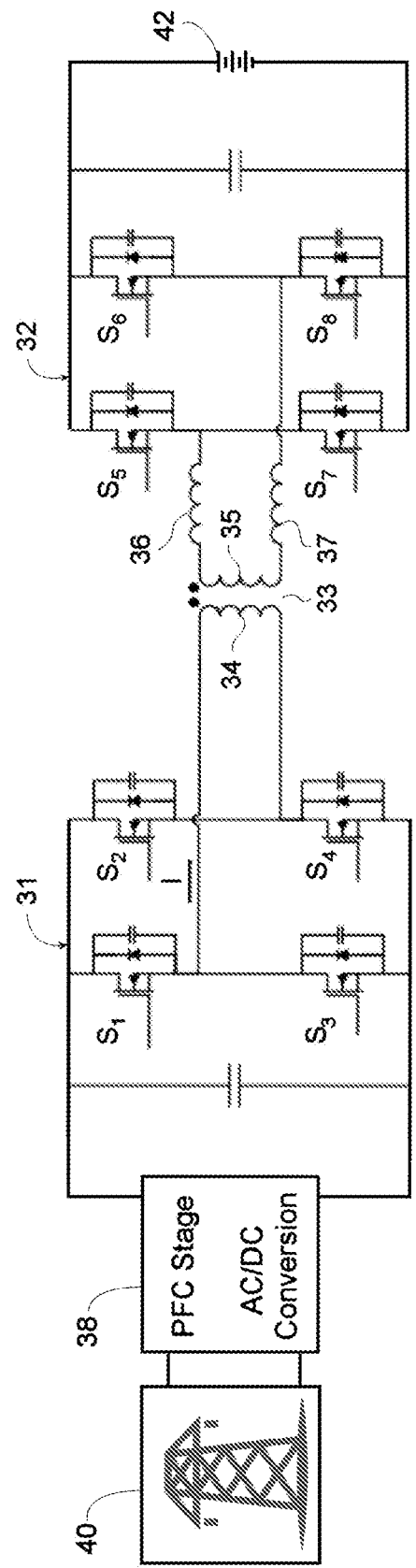

First converter 31 receives a primary DC-link voltage $V_{in}$ from a voltage source 39, for example, from the grid 40 via a PFC (Power Factor Correction) power stage 38 or a Full Bridge (FB) AC-DC stage, and operates as a DC-DC converter. Second converter 32 operates as a DC-DC converter to provide a DC-link voltage to a load 41, such as a battery 42. Examples of this configuration are depicted in FIGS. 6 and 7. Therefore, the combination of a PFC or FB stage and of a DAB according to the invention provides for isolated and bi-directional power conversion and is particularly suitable, among many possible applications, for On-Board Chargers (OBC) of electric vehicles for deployment in charging, vehicle-to-grid, vehicle-to-load, and grid ancillary services. Other applications of dual active bridge 30 are however possible.

In a dual active bridge according to the invention, a plurality of inductors is arranged along the legs of one of the two windings of the high frequency transformer and are split between the legs of that winding. In the embodiment illustrated in FIG. 3, there are two inductors 36 and 37, one of which is disposed on a first leg of winding 35 and the other one of which is disposed on the second leg of winding 35.

It can be seen that, in the present embodiment, inductors 36 and 37 are arranged on the legs of winding 35 on the secondary side of dual active bridge 30, but in different embodiments, more than two inductors may be present and be split between the legs of winding 35. In still other embodiments, the inductors may be split between the legs of winding 34 on the primary side of the dual active bridge.

A dual active bridge with distributed inductance according to the invention, such as dual active bridge 30, provides the advantage of reducing the Volt-microsecond (V-µs) product substantially due to the sum of the voltage applied over each of the phases.

Figure 4:
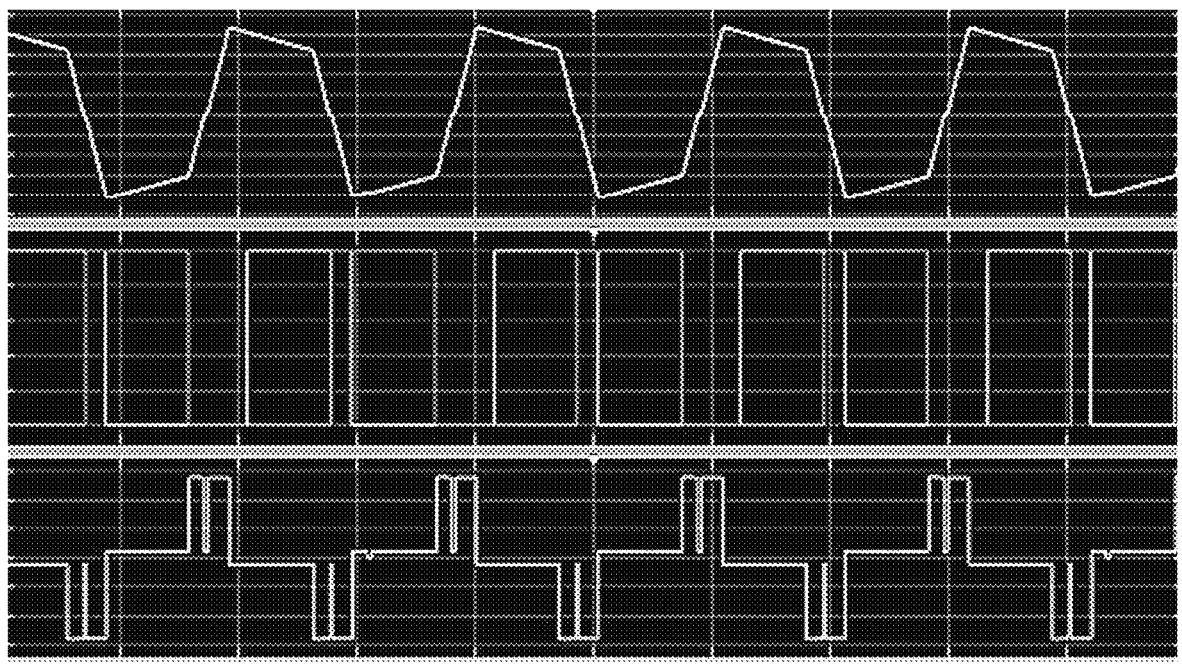
FIG. 4 is a chart illustrating the operation of a dual active bridge as depicted in FIG. 3.

Turning now to FIG. 4, it can be seen that, by placing the inductance across a common-core inductor on the two output leads of the DAB transformer, a substantial reduction in inductor V-µs product takes place and, consequently, there is a reduction in peak currents. This leads to a reduction in peak flux requirements (that is, less core material) and a reduction in copper and active switch losses due to a slight reduction in peak current.

Still with reference to FIG. 4, the voltage across the indictor can be expressed as:

$$V_{lk} = \frac{1}{2} \cdot (V_{in} + V_{out}) - \Sigma V_{CESAT\text{-}S1 \ldots CESAT\text{-}S8} - (I \cdot R) \quad (1)$$

where:
$V_{lk}$=voltage across the first and the second inductor,
$V_{in}$=DC-link voltage from a voltage source,
$V_{out}$=DC-link voltage to a load,
$V_{CESAT\text{-}S1 \ldots CESAT\text{-}S8}$=saturation voltage of bidirectional switch cells $S_1 \ldots S_8$,
I=current,
R=resistance of the first and the second inductor.

Therefore, when there are eight bidirectional switch cells, equation (1) reads as:

$$V_{lk} = \frac{1}{2} \cdot (V_{in} + V_{out}) - (V_{CESAT-S1} + V_{CESAT-S2} + V_{CESAT-S3} + V_{CESAT-S4} + V_{CESAT-S5} + V_{CESAT-S6} + V_{CESAT-S7} + V_{CESAT-S8}) - (I \cdot R) \quad (2)$$

In a high voltage application, such as that depicted in FIG. 4, equation (2) may be written as:

$$V_{lk} = \frac{1}{2} \cdot (375 + 350) - (2 \cdot 8) - (20 \cdot 1.5) = 316 \quad (3)$$

In this application, a person of skill in the art will notice voltages nearing 300 VDC for only a modestly higher $T_{on}$ period. Therefore, the V-µs product is $300/48000 \cdot T_{on}/T_{period} = 1,625$ V-µs assuming a 26% duty cycle. This corresponds to a core flux reduction of 26%.

Figure 5:
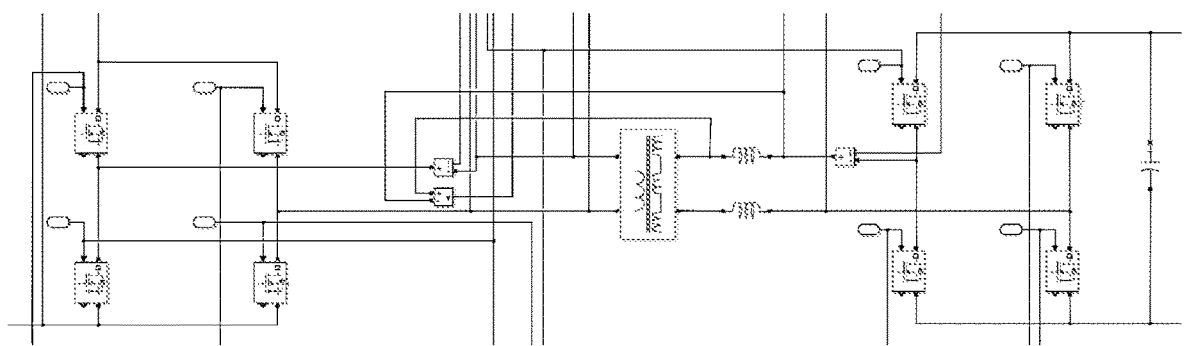
FIG. 5 illustrated an application of a dual active bridge as depicted in FIG. 3.

FIG. 5 illustrates an actual implementation of a DAB with distributed inductance according to the invention in a real-life application.

While the invention has been described in connection with the above-described embodiments, it is not intended to limit the scope of the invention to the particular forms set forth, but on the contrary, it is intended to cover such alternatives, modifications, and equivalents as may be included within the scope of the invention. Further, the scope of the present invention fully encompasses other embodiments that may become obvious to those skilled in the art and the scope of the present invention is limited only by the appended claims.

The invention claimed is:

1. A dual active bridge comprising:
   a first converter arranged on a primary side of the dual active bridge;
   a second converter arranged on a secondary side of the dual active bridge;

a high frequency transformer having two windings and operatively connecting the first converter to the second converter; and a plurality of inductors arranged along legs on one of the two windings of the high frequency transformer, the plurality of inductors being split between the legs of the one of the two windings, wherein the plurality of inductors are split between the legs of the one of the two windings disposed on the secondary side of the dual active bridge, wherein the plurality of inductors consists of a first inductor and a second inductor, and wherein the first inductor is arranged on a first leg of the one of the windings, and the second inductor is arranged on a second leg of the one of the windings, and wherein each of the first and the second converter comprises four switch cells, and wherein a voltage across the first and the second inductor is:

$$V_{lk} = \frac{1}{2} \cdot (V_{in} + V_{out}) - \Sigma V_{CESAT-S1 \ldots CESAT-S8} - (I \cdot R)$$

wherein:

$V_{lk}$=voltage across the first and the second inductor,
$V_{in}$=primary DC-link voltage,
$V_{out}$=secondary DC-link voltage,
$V_{CESAT-S1 \ldots CESAT-S8}$=saturation voltage of switch cells $S_1 \ldots S_8$,
I=current,
R=resistance of the first and the second inductor.

2. The dual active bridge according to claim 1, wherein the first converter receives a primary DC-link voltage from a voltage source via an AC-DC Power Factor Correction stage, and wherein the second converter provides a secondary DC-link voltage to a load.

3. The dual active bridge according to claim 2, wherein the AC-DC Power Factor Correction stage is connected to a grid, and wherein the load is a battery.

* * * * *